US012688740B2

(12) United States Patent
Giraud et al.

(10) Patent No.: US 12,688,740 B2
(45) Date of Patent: Jul. 21, 2026

(54) DEVICE FOR DETERMINING A STATE OF WEAR OF A WIPER BLADE

(71) Applicant: Valeo Systèmes d'Essuyage, Le Mesnil Saint Denis (FR)

(72) Inventors: Frederic Giraud, Le Mesnil Saint Denis (FR); Alexandre Filloux, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 49 days.

(21) Appl. No.: 18/575,314

(22) PCT Filed: Jun. 30, 2022

(86) PCT No.: PCT/EP2022/068090
§ 371 (c)(1),
(2) Date: Dec. 29, 2023

(87) PCT Pub. No.: WO2023/275265
PCT Pub. Date: Jan. 5, 2023

(65) Prior Publication Data
US 2024/0304040 A1     Sep. 12, 2024

(30) Foreign Application Priority Data
Jun. 30, 2021     (FR) ...................................... 2107096

(51) Int. Cl.
*G07C 5/08* (2006.01)
*B60S 1/08* (2006.01)

(52) U.S. Cl.
CPC ............... *G07C 5/0808* (2013.01); *B60S 1/08* (2013.01)

(58) Field of Classification Search
None
See application file for complete search history.

(56) References Cited

U.S. PATENT DOCUMENTS 6,107,766 A * 8/2000 Amagasa .............. B60S 1/0814
318/443
2014/0082874 A1 3/2014 Dias
2014/0088886 A1 3/2014 Dias

FOREIGN PATENT DOCUMENTS

DE    102004016449 A1 * 10/2005    ............... B60S 1/08
DE    102004051692 A1 * 4/2006     ............... B60S 1/08
DE    102015003556 A1 * 10/2015    ............... B60S 1/08
(Continued)

OTHER PUBLICATIONS

"Angular acceleration", Wikipedia, revision of May 25, 2021 (Year: 2021).*
(Continued)

*Primary Examiner* — Navid Z. Mehdizadeh
*Assistant Examiner* — Sarah A. Mueller
(74) *Attorney, Agent, or Firm* — Osha Bergman Watanabe & Burton LLP

(57) ABSTRACT

A device for determining a state of wear of a wiper blade for a wiper system is disclosed. The device is configured to be fitted in a motor vehicle. The device for determining a state of wear includes an angular position sensor configured to measure at least one datum relating to a wiper blade during a wiping operation and an electronic control unit configured to determine the state of wear of the wiper blade as a function of the at least one datum measured by the angular position sensor.

4 Claims, 2 Drawing Sheets

(56)        References Cited

FOREIGN PATENT DOCUMENTS

| | | | |
|---|---|---|---|
| DE | 102019218660 | A1 | 6/2021 |
| EP | 2316699 | A2 | 5/2011 |
| EP | 2524845 | A1 | 11/2012 |
| FR | 3071794 | A1 | 4/2019 |

OTHER PUBLICATIONS

Machine translation of Kübel et al. (DE-102004051692-A1) (Year: 2006).*
Machine translation of Krickl (DE-102015003556-A1) (Year: 2015).*
Machine translation of Ostrowski (DE-102004016449-A1) (Year: 2005).*
International Search Report issued in corresponding International Application No. PCT/EP2022/068090 mailed Sep. 7, 2022 (5 pages).
Written Opinion issued in corresponding International Application No. PCT/EP2022/068090 mailed Sep. 7, 2022 (5 pages).
Office Action issued by the CNIPA for corresponding Chinese Patent Application No. 202280045633.7, mailed Apr. 23, 2026 (16 pages).

* cited by examiner

[Fig. 1]
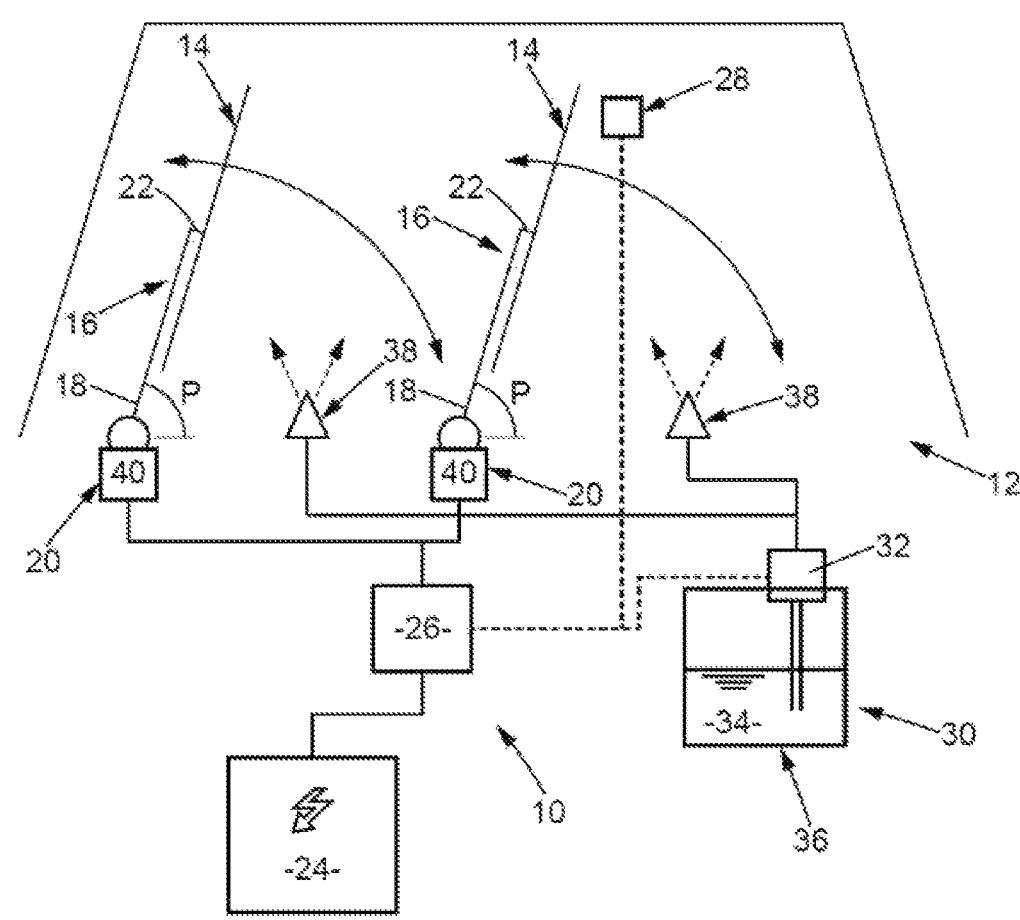
[Fig. 2]
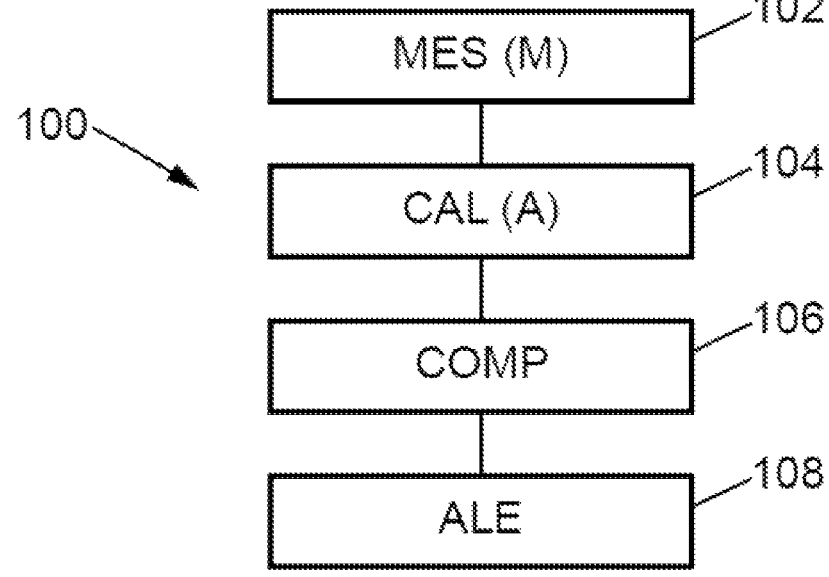

[Fig. 3]
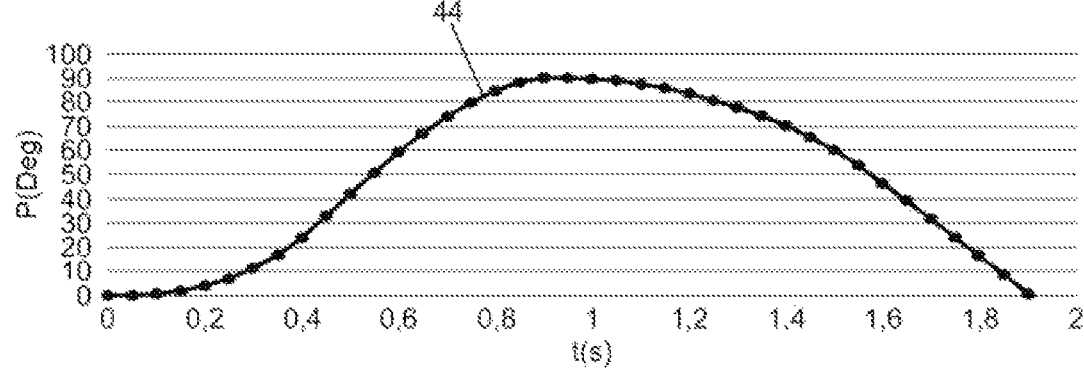
[Fig. 4]
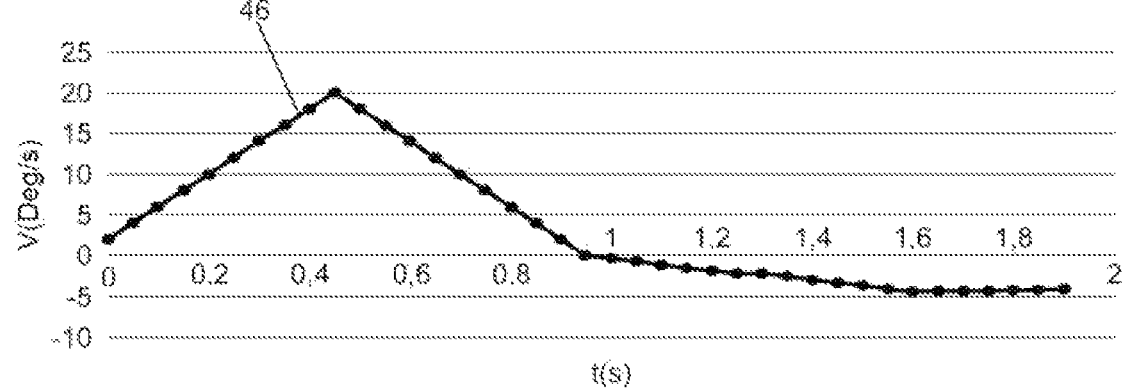
[Fig. 5]
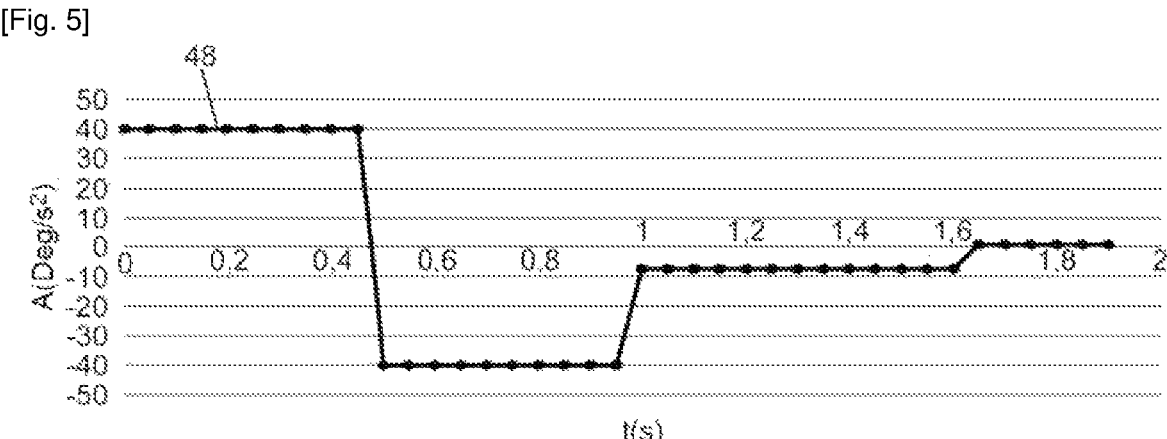

DEVICE FOR DETERMINING A STATE OF WEAR OF A WIPER BLADE

TECHNICAL FIELD

The present disclosure relates to the field of wiper blade systems for motor vehicles.

PRIOR ART

Wiper blades have the particular function of wiping a glass surface of a vehicle when washing this surface or quite simply wiping away raindrops in bad weather in order to ensure good visibility for the user of the vehicle.

These wiper blades have a limited lifespan. Thus, a worn wiper blade requiring replacement will result in poor wiping of the glass surface, with the risk of leading to loss of visibility for the vehicle user and causing a serious accident.

Systems exist for detecting wear of wiper blades. When one of the wiper blades is worn out, the vehicle user can be warned via an audible signal or a light signal displayed on the vehicle dashboard. Having been warned, the vehicle user is then aware that they must replace the wiper blade as quickly as possible. However, such a solution has a major flaw in that by the time the vehicle user is warned, the wiper blade has already ceased to be functional. Thus, between the time the vehicle user is informed that their wiper blade is worn and the time said vehicle user replaces said wiper blade, a certain period of time may elapse where the user is driving their vehicle with a worn wiper blade. This period of time can be an issue in the event of heavy rain affecting visibility, the vehicle user thus putting themselves at risk, as well as other vehicle users or pedestrians. Furthermore, if the user relies on an average lifespan of the wiper blade fitted on their vehicle, replacing it at the end of said average lifespan in order to avoid driving with a worn blade, there is the risk of premature replacement and therefore economic detriment to the vehicle user.

SUMMARY

The present disclosure improves the situation.

To this end, the invention relates to a device for determining a state of wear of a wiper blade for a wiper system intended to be fitted in a motor vehicle, the device for determining a state of wear comprising an angular position sensor configured to measure at least one datum relating to the wiper blade during a wiping operation and an electronic control unit configured to determine the state of wear of the wiper blade as a function of at least one datum measured by the angular position sensor.

Thus, the device according to the present invention makes it possible to estimate in real time the level of wear of the wiper blade and to optimize its replacement. Furthermore, as the vehicle is already equipped with the angular position sensor, the device according to the present invention does not make the motor vehicle more complex or heavier.

According to another aspect, said at least one datum measured by the angular position sensor is an angular position of the wiper blade.

According to another aspect, the electronic control unit is configured to calculate an angular acceleration of the wiper blade from the angular position of the wiper blade.

According to another aspect, the electronic control unit is configured to compare the calculated angular acceleration with at least one parameter representative of a known state of wear.

According to another aspect, the parameter representative of a known state of wear is a profile of evolution of the angular acceleration over a time interval or an average value.

According to another aspect, the electronic control unit is configured to compare the calculated angular acceleration with a plurality of parameters, each parameter being representative of a respective known state of wear.

According to another aspect, the electronic control unit is configured to identify the state of wear of the wiper blade in relation to the known state of wear the representative parameter of which is closest to the calculated angular acceleration.

Also proposed is a method for determining a state of wear of a wiper blade for a wiper system intended to be fitted in a motor vehicle, preferably implemented by a device for determining a state of wear as described above, the method for determining a state of wear comprising a step of measuring at least one datum measured by an angular position sensor during a wiping operation.

According to another aspect, said at least one datum measured by the angular position sensor is an angular position of the wiper blade.

According to another aspect, the method comprises a step of calculation, by the electronic control unit, of an angular acceleration from the angular position of the wiper blade.

According to another aspect, the method comprises a step of comparison, by the electronic control unit, of the calculated angular acceleration with at least one parameter representative of a known state of wear.

According to another aspect, the parameter representative of a known state of wear is a profile of evolution of the angular acceleration over a time interval or an average value.

According to another aspect, the method comprises a step of comparison, by the electronic control unit, of the calculated angular acceleration with a plurality of parameters, each parameter being representative of a respective known state of wear.

According to another aspect, the method comprises a step of identification, by the electronic control unit, of the state of wear of the wiper blade in relation to the known state of wear the representative parameter of which is closest to the calculated angular acceleration.

Also proposed is a wiper system for a motor vehicle, comprising a device for determining a state of wear as described above, at least one wiper blade, a drive arm for said at least one wiper blade and a drive motor for the drive arm, the angular position sensor of the device for determining a state of wear being mounted on a shaft of the drive motor.

According to another aspect, a computer program is proposed, comprising instructions for implementing all or part of a method as defined herein when this program is executed by a processor. According to another aspect, a non-transitory computer-readable storage medium is proposed, on which such a program is stored.

BRIEF DESCRIPTION OF THE DRAWINGS

Further features, details and advantages will become apparent on reading the detailed description below, and on studying the appended drawings, in which:

FIG. 1 is a schematic view of a vehicle windshield wiper system comprising a device for determining a state of wear of a wiper blade according to the present invention.

FIG. 2 shows a flowchart of a method for determining a state of wear of a wiper blade according to the present invention, implemented by the device for determining a state of wear of FIG. 1.

FIG. 3 shows an evolution over time of an angular position of the wiper blade of FIG. 1 during a complete rotation cycle.

FIG. 4 shows an evolution over time of an angular speed of the wiper blade of FIG. 1.

FIG. 5 shows an evolution over time of an angular acceleration of the wiper blade of FIG. 1.

DESCRIPTION OF THE EMBODIMENTS

Reference is now made to FIG. 1, which shows a wiper system 10 for wiping a window 12 of a motor vehicle, in this case a windshield of the vehicle.

The wiper system 10 comprises, in this case, two wiper blades 14. Each wiper blade 14 is borne by a blade holder 16, also commonly referred to as a wiper arm or drive arm.

In a known manner, not shown in detail, each wiper blade 14 includes at least one wiper strip, which is a flexible strip made of natural or synthetic elastomer and has a lower edge, with a longitudinal orientation in the longitudinal general direction of the wiper blade 14, which interacts with the outer surface of the windshield 12 so as to clean and/or wipe the latter. The working edge of the wiper strip is also called the lip of the wiper strip.

A proximal end 18 of each blade holder 16 is connected to a drive motor 20, while a distal end 22 of each blade holder 16 is connected to the wiper blade 14 that it bears.

Each drive motor 20 is designed to drive the blade holder 16 so as to wipe in an alternating pivoting motion, or a cyclical rotary motion, in a portion of a circular arc, about a pivot or rotational axis the general orientation of which is generally orthogonal to the longitudinal general orientation of the blade holder 16. The successive positions of the blade holder 16 and the associated wiper blade 14 during their cyclical rotary motion are described as a wiping operation.

In a known manner, each drive motor 20 includes an output shaft, not shown, that transmits a drive torque to the associated blade holder 16, directly or for example by way of a linkage.

Each drive motor 20 is for example an electric motor, and the drive motors 20 are connected to an electric power source 24, such as for example an accumulator battery of the vehicle or an alternator.

Each drive motor 20 is connected to the electric power source 24 by way of a unit 26 for controlling and managing the wiper system 10, otherwise referred to as the electronic control unit.

The control and management unit 26 is designed and configured in particular to manage the operation of the wiper system 10 according to a plurality of predefined use programs, for example by controlling the rotary driving speed of the blade holders 16 by regulating the current supplied to the drive motors 20, for a given value of the supply voltage of the drive motors 20 supplied by the electric power source 24.

By way of addition and without limitation, the wiper system 10 also comprises a rain sensor 28 that is linked to the control and management unit 26.

The wiper system 10 also in this case comprises a device 30 for cleaning the outer surface of the windshield, which device includes a pump 32 which is connected to the control and management unit 26 and to the electric power source 24, and which is designed to draw windshield washer liquid 34 from a reservoir 36 and convey it as far as means for spraying the liquid onto the outer surface of the windshield 12, these spray means for example being nozzles 38 arranged on the hood of the motor vehicle, or borne by the wiper blades 14, or by the blade holders 16.

In a known manner, each blade holder 16 is capable of occupying a position referred to as the service position or position of use when wiping, in which the wiping edge of the wiper strip of the wiper blade is in contact with the outer surface of the wiped window, specifically the windshield.

In the service position of each blade holder 16, the latter may be driven in an alternating cyclical wiping motion by the drive motors 20.

When the vehicle is parked and stationary, the wiper blade and the associated wiper strips are in their service position or in a storage position, referred to as the parking position.

The wiper system 10 also includes an angular position sensor 40 in the drive motor 20. The angular position sensor 40 is configured to measure the angular position of the wiper blade in real time during the wiping operation. In FIG. 1, the letter P designates the position of the wiper blade 14/blade holder 16 assembly.

The angular position sensor 40 makes it possible in particular to stop each wiper blade 14 and associated blade holder 16 in the parking position when the wiper system is stopped.

During the life of the wiper system, the strips gradually wear out, particularly under the effect of various environmental stresses such as solar radiation and outdoor temperatures.

According to the present invention, the control and management unit 26 is configured to determine the state of wear of the wiper blade as a function of at least one datum measured by the angular position sensor. Preferably, said at least one datum measured by the angular position sensor is an angular position of the wiper blade. Advantageously, the control and management unit 26 is configured to calculate an angular acceleration of the wiper blade from the angular position of the wiper blade, as will be described in detail below.

The angular position sensor 40 and the control and management unit 26 form a device 42 for determining the state of wear of the wiper blades 14.

The invention also relates to a method 100 for determining the state of wear of the wiper blades 14, preferably implemented by the device 42 for determining the state of wear of the wiper blades 14.

As can be seen in FIG. 2, the method 100 comprises a step 102 of measuring (MES) at least one datum M measured by the angular position sensor 40 during the wiping operation. Preferably, said at least one datum measured by the angular position sensor is the angular position of the wiper blade. In other words, in this case, the measured datum M is equal to the angular position P.

As can also be seen in FIG. 2, the method 100 comprises a step 104 of calculation (CAL) of an angular acceleration, denoted A, from the angular position P. The angular acceleration A is the second time derivative of the angular position P. The angular acceleration A is also the first time derivative of an angular speed V, itself the first time derivative of the angular position P.

By way of example, FIGS. 3 to 5 show respective curves 44, 46 and 48 of evolution over time t, over a period of less than 2 seconds, of the angular position P of the wiper blade, the angular speed V and the angular acceleration A.

The method 100 also comprises a step 106 of comparison (COMP), by the electronic control unit, of the calculated angular acceleration A with at least one parameter representative of a known state of wear.

According to a first variant, the representative parameter is an average value, Moy.

In this case, the angular acceleration A may be calculated at a single time (per wiping operation) or at several given times, possibly at regularly spaced times, during step 104, and the calculated value A may be compared to said average value Moy. As long as, in absolute value, the difference between the calculated value A and the average value Moy is less than or equal to a predefined threshold, the state of wear is considered new. When the difference, in absolute value, between A and Moy exceeds the predefined threshold, then the state of wear is considered old. The method 100 then advantageously comprises a step 108 of alerting (ALE) the user, for example in the form of triggering a light and/or audible signal on the dashboard of the motor vehicle.

According to a second variant, the parameter representative of a known state of wear is a profile, referred to as a reference profile, of evolution of the angular acceleration over a time interval, for example over a rotation cycle or over a defined number of rotation cycles, for example five rotation cycles. As long as, in absolute value, the difference between the profile of evolution of the calculated values A and the profile of the references is less than or equal to a predefined threshold, the state of wear is considered new. When the difference, in absolute value, between A and Moy exceeds the predefined threshold, then the state of wear is considered old. Note that it is possible to calculate the difference for each position P measurement, which corresponds for example to around fifty difference calculations. The method 100 then advantageously comprises a step 108 of alerting (ALE) the user, for example in the form of triggering a light and/or audible signal on the dashboard of the motor vehicle.

According to a third variant, each calculated acceleration A is compared, by the electronic control unit, with a plurality of parameters, each parameter being representative of a respective known state of wear. For example, three levels of wear may be defined: new, medium and old. In this case, each calculated acceleration A is compared with each parameter representative of each level of wear, and each of the differences, En, Em and Ev, between the value A and the respective parameter representative of the level of wear, new, medium and old, is calculated. The state of wear is attributed to the smallest difference out of the differences En, Em and Ev. When the state of wear is old, the method 100 then advantageously comprises a step 108 of alerting (ALE) the user, for example in the form of triggering a light and/or audible signal on the dashboard of the motor vehicle.

Note that, according to this variant, each representative parameter may be a reference profile as discussed in relation to the second variant, and associated with the respective level of wear, new, medium or old. The differences En, Em and Ev are then advantageously calculated for each position P measurement, which corresponds for example to around fifty difference calculations.

Note also that it is possible to couple with each variant described above the setpoint intensity measurement supplied by the electrical power source 24 to the drive motor 20, which gives an additional indication of the state of wear of each wiper blade 14, since each blade generates a resistant torque which increases with wear, and increases the value of the setpoint intensity.

Thus, by virtue of the device 42 for determining the state of wear of the wiper blades 14 and the method 100 for determining the state of wear of the wiper blades 14 according to the present invention, it is possible to estimate in real time the state of wear of the wiper blade 14, using only the angular position sensor 40 and the control and management unit 26 of the wiper system 10, without it being necessary to add sensors specially for determining the state of wear of the wiper blade 14.

The invention claimed is:

1. A wiper system for a motor vehicle comprising:
at least one wiper blade;
a drive arm for the at least one wiper blade;
a drive motor for the drive arm;
a device for determining a state of wear of the at least one wiper blade, wherein the device is configured to be fitted in the motor vehicle, the device comprising:
   an angular position sensor mounted on a shaft of the drive motor and configured to measure an angular position of the at least one wiper blade during a wiping operation, and
   an electronic control unit configured to:
      calculate an angular acceleration of the at least one wiper blade from the angular position; and
      determine the state of wear of the at least one wiper blade by comparing the angular acceleration with at least one parameter representative of a known state of wear.

2. A method for determining a state of wear of a wiper blade for a wiper system,
   wherein the wiper system is configured to be fitted in a motor vehicle, the wiper system comprising:
      at least one wiper blade;
      a drive arm for the at least one wiper blade;
      a drive motor for the drive arm;
      a device for determining the state of wear of the at least one wiper blade, wherein the device is configured to be fitted in the motor vehicle, the device comprising:
         an angular position sensor mounted on a shaft of the drive motor; and
         an electronic control unit;
   the method comprising:
      measuring, by the angular position sensor, an angular position of the at least one wiper blade during a wiping operation,
      calculating, using the electronic control unit, an angular acceleration of the at least one wiper blade from the angular position, and
      determining, using the electronic control unit, the state of wear of the at least one wiper blade by comparing the angular acceleration with at least one parameter representative of a known state of wear.

3. The method for determining the state of wear as claimed in claim 2,
   wherein the at least one parameter representative of the known state of wear is a profile of evolution of the angular acceleration over a time interval or an average value.

4. The method for determining the state of wear as claimed in claim 2,
   wherein, during comparison, the angular acceleration is compared, by the electronic control unit, with a plurality of parameters,
      wherein each parameter is representative of a respective known state of wear.

* * * * *